(12) United States Patent
Swanson et al.

(10) Patent No.: US 10,208,523 B1
(45) Date of Patent: Feb. 19, 2019

(54) POWER TAILGATE MOUNTING SYSTEM FOR A VEHICLE

(71) Applicant: Honda Motor Co., Ltd., Tokyo (JP)

(72) Inventors: Adam K. Swanson, Marysville, OH (US); Timothy J. Palesano, Marysville, OH (US); Ryan M. Stokes, Dublin, OH (US); Andrew W. Hegge, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/670,792

(22) Filed: Aug. 7, 2017

(51) Int. Cl.
| B62D 25/00 | (2006.01) |
| E05F 15/611 | (2015.01) |
| B62D 33/027 | (2006.01) |

(52) U.S. Cl.
CPC .......... *E05F 15/611* (2015.01); *B62D 33/027* (2013.01); *E05Y 2201/602* (2013.01); *E05Y 2600/40* (2013.01); *E05Y 2600/54* (2013.01); *E05Y 2900/546* (2013.01)

(58) Field of Classification Search
CPC ........ B62D 25/06; B62D 25/04; B62D 25/02; B60J 7/10; B60J 5/101; B60R 9/00
USPC ............................ 296/50, 210, 146.8, 29, 56
See application file for complete search history.

(56) References Cited

U.S. PATENT DOCUMENTS

| 3,713,472 | A | * | 1/1973 | Dozois | ....................... | B60J 5/12 |
| | | | | | | 160/189 |
| 5,448,856 | A | * | 9/1995 | Moore | ................... | E05F 15/611 |
| | | | | | | 49/28 |
| 6,055,776 | A | * | 5/2000 | Dettling | ................ | E05F 15/619 |
| | | | | | | 296/56 |
| 6,092,337 | A | * | 7/2000 | Johnson | ................ | E05F 15/619 |
| | | | | | | 296/146.8 |
| 6,137,249 | A | * | 10/2000 | Butler | ................... | E05F 15/619 |
| | | | | | | 296/107.16 |
| 6,142,551 | A | * | 11/2000 | Ciavaglia | .............. | E05F 15/619 |
| | | | | | | 296/146.4 |
| 6,202,350 | B1 | * | 3/2001 | Montgomery | ........ | E05F 1/1091 |
| | | | | | | 49/139 |
| 6,283,535 | B1 | * | 9/2001 | Yuge | ....................... | E05F 15/63 |
| | | | | | | 296/146.1 |
| 6,401,392 | B1 | * | 6/2002 | Yuge | ..................... | E05F 15/619 |
| | | | | | | 49/340 |
| 6,405,486 | B1 | * | 6/2002 | Rogers, Jr. | ............ | E05F 15/619 |
| | | | | | | 296/146.1 |

(Continued)

FOREIGN PATENT DOCUMENTS

| CN | 1755053 | 4/2006 |
| CN | 204279005 | 4/2015 |

*Primary Examiner* — Kiran B Patel
(74) *Attorney, Agent, or Firm* — Rankin, Hill & Clark LLP

(57) ABSTRACT

A power tailgate mounting system for a vehicle includes a first gusset member and a second gusset member. The first gusset member is secured to an inward side of a roof rail of the vehicle at a rear end portion of the roof rail. The first gusset member has a first gusset tailgate motor mounting portion extending laterally inwardly from the roof rail for mounting an associated tailgate motor. The second gusset member is secured to the inward side of the roof rail at the rear end portion of the roof rail. The second gusset member has a second gusset tailgate mounting portion extending laterally inwardly from the roof rail for mounting the associated tailgate motor. The second gusset tailgate mounting portion overlaps the first gusset tailgate mounting portion.

19 Claims, 6 Drawing Sheets

(56) References Cited

U.S. PATENT DOCUMENTS

| | | | | |
|---|---|---|---|---|
| 6,711,855 B1* | 3/2004 | Daniels | E05F 15/619 | 49/139 |
| 6,776,443 B2* | 8/2004 | Shimura | E05F 15/619 | 296/146.8 |
| 6,814,392 B1* | 11/2004 | Tomaszewski | E05F 15/622 | 296/146.4 |
| 6,834,463 B2* | 12/2004 | Fukumoto | E05F 15/63 | 296/146.8 |
| 6,901,704 B2 | 6/2005 | Sakaue et al. | | |
| 6,929,310 B2* | 8/2005 | Okada | E05D 15/42 | 296/146.8 |
| 7,083,221 B2 | 8/2006 | Hida | | |
| 7,117,638 B2* | 10/2006 | Ihashi | E05F 15/619 | 49/340 |
| 7,118,115 B2 | 10/2006 | Abel | | |
| 7,429,073 B2* | 9/2008 | Watanabe | F16D 27/112 | 192/48.2 |
| 7,785,220 B2* | 8/2010 | Ciavaglia | E05F 15/627 | 384/255 |
| 7,806,012 B2* | 10/2010 | Rice | E05F 15/63 | 49/324 |
| 7,810,280 B2* | 10/2010 | Hattori | E05F 15/63 | 49/340 |
| 8,366,176 B2* | 2/2013 | Kaburaki | E05F 15/63 | 296/146.4 |
| 8,671,619 B2* | 3/2014 | Stenzel | E05F 15/63 | 49/324 |
| 8,899,658 B1 | 12/2014 | Gangal et al. | | |
| 9,523,231 B2* | 12/2016 | Ciavaglia | E05F 15/63 | |
| 2003/0136054 A1* | 7/2003 | Daniels | E05F 15/627 | 49/340 |
| 2003/0218357 A1* | 11/2003 | Mitsui | E05F 15/63 | 296/146.8 |
| 2009/0250911 A1* | 10/2009 | Sia, Jr. | B60R 13/025 | 280/728.3 |
| 2014/0265415 A1* | 9/2014 | Wasser | B60J 5/106 | 296/56 |
| 2017/0089116 A1* | 3/2017 | Heiberger | E05F 15/614 | |
| 2018/0171677 A1* | 6/2018 | Im | E05B 81/14 | |
| 2018/0171679 A1* | 6/2018 | Im | E05B 81/20 | |

* cited by examiner

POWER TAILGATE MOUNTING SYSTEM FOR A VEHICLE

BACKGROUND

A single drawn sheet metal stamping is conventionally used to reinforce the location at which a power tailgate motor is mounted to the vehicle. While this works in many vehicle configurations, some vehicle package designs have an increased distance between the load point for the power tailgate motor and its attachment to the general body structure. Directional loading on the power tailgate motor under the forced closed loading condition can be severe and can require a very rigid mount for the motor. Use of the conventional reinforcement method could potentially result in deflection of the outer roof panel on the vehicle and is thus unacceptable.

SUMMARY

According to one aspect, a power tailgate mounting system for a vehicle includes a first gusset member and a second gusset member. The first gusset member is secured to an inward side of a roof rail of the vehicle at a rear end portion of the roof rail. The first gusset member has a first gusset tailgate motor mounting portion extending laterally inwardly from the roof rail for mounting an associated tailgate motor. The second gusset member is secured to the inward side of the roof rail at the rear end portion of the roof rail. The second gusset member has a second gusset tailgate mounting portion extending laterally inwardly from the roof rail for mounting the associated tailgate motor. The second gusset tailgate mounting portion overlaps the first gusset tailgate mounting portion.

According to another aspect, a cantilevered motor mounting system for a vehicle tailgate motor includes a side roof rail, a first gusset member, and a second gusset member. The first gusset member is fixedly secured to the side roof rail adjacent and spaced forwardly relative to a terminal end of the side roof rail. The second gusset member is fixedly secured to the side roof rail adjacent and spaced forwardly relative to the terminal end of the side roof rail. The second gusset member is secured to the side roof rail at a second gusset location spaced apart rearwardly relative to a first gusset location at which the first gusset member is secured to the side roof rail. The first gusset member has a first gusset tailgate motor mounting portion extending laterally inwardly from the side roof rail and the second gusset member has a second gusset tailgate mounting portion extending laterally inwardly from the roof rail.

According to a further aspect, a vehicle mounting system includes a first gusset member and a second gusset member. The first gusset member is fixedly secured to an associated roof rail on a vehicle. The first gusset member has a first gusset tailgate motor mounting portion extending laterally inwardly from the roof rail for mounting an associated tailgate motor. The second gusset member is fixedly secured to the associated roof rail at a location spaced apart rearwardly from that at which the first gusset member is fixedly secured to the associated roof rail. The second gusset member has a second gusset tailgate mounting portion extending laterally inwardly from the roof rail for mounting the associated tailgate motor. The second gusset tailgate mounting portion overlaps the first gusset tailgate mounting portion.

DETAILED DESCRIPTION

Figure 1:
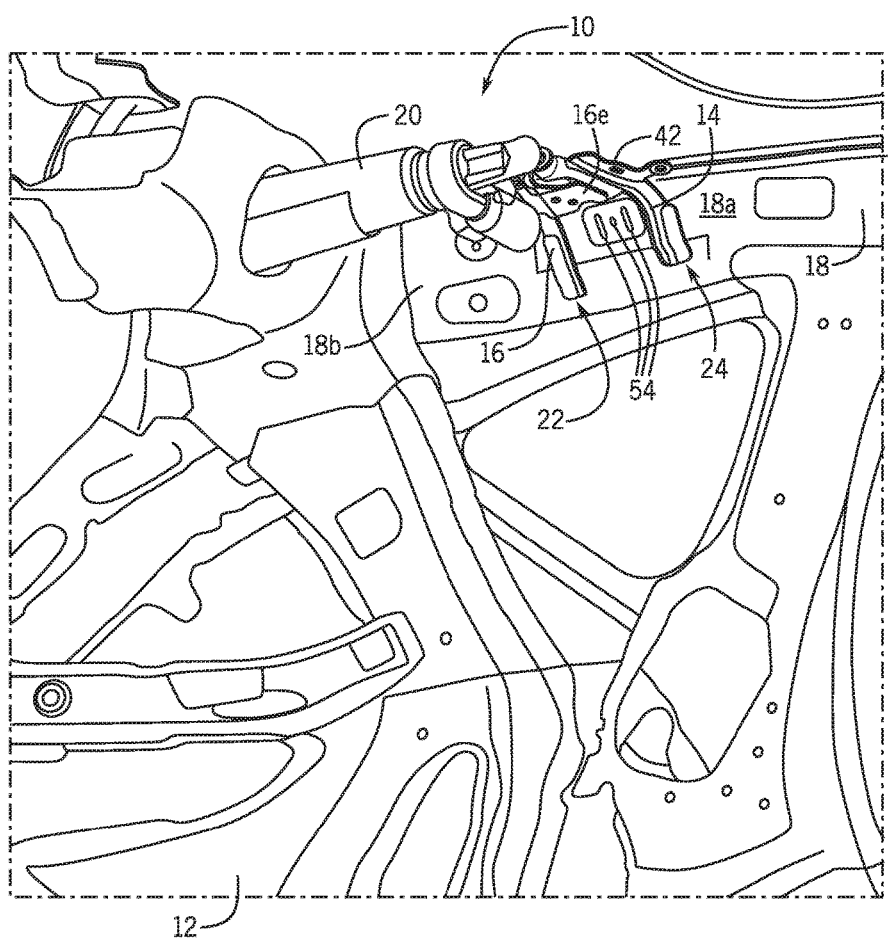
FIG. 1 is a schematic partial perspective view of a power tailgate mounting system for a vehicle according to an exemplary embodiment shown from an inside perspective of the vehicle.

Referring now to the drawings wherein the showings are for purposes of illustrating one or more exemplary embodiments and not for purposes of limiting the same, FIGS. 1-6 show a power tailgate mounting system 10 for a vehicle 12 according to an exemplary embodiment. The mounting system 10, which can also be referred to as a cantilevered motor mounting system, includes a first gusset member 14 and a second gusset member 16. As shown, the first gusset member 14 is secured to an inward side 18a of a roof rail 18 of the vehicle 12 at or adjacent a rear end portion 18b of the roof rail 18. The second gusset member 16 is likewise secured to the inward side 18a of the roof rail 18 at or adjacent the rear end portion 18b of the roof rail 18. Herein, any securing of the components (e.g., the first and second gusset members 14, 16 to the roof rail 18) can be via welding unless otherwise indicated.

The first gusset member 14 has a first gusset tailgate motor mounting portion 14a extending laterally inwardly from the roof rail 18 for mounting an associated tailgate motor 20. Likewise, the second gusset member 16 has a second gusset tailgate motor mounting portion 16a extending laterally inwardly from the roof rail 18 for mounting the tailgate motor 20. As will be described in more detail below, the second gusset tailgate motor mounting portion 16a overlaps the first gusset tailgate motor mounting portion 14a to provide a rigid mount for the tailgate motor 20.

In the illustrated embodiment, the roof rail 18 is a side roof rail and the rear end portion 18b of the roof rail 18 is a terminal end or end portion of the roof rail 18. Thus, the first gusset member 14 is fixedly secured to the roof rail 18 adjacent and spaced forwardly relative to the terminal end 18b of the roof rail 18 and the second gusset member 16 is fixedly secured to the roof rail 18 adjacent and spaced forwardly relative to the terminal end 18b of the roof rail 18. As shown, the second gusset member 16 is secured to the roof rail 18 at a second gusset location 22 spaced apart rearwardly relative to a first gusset location 24 at which the first gusset member 14 is secured to the roof rail 18. Thus, the first gusset member 14 is fixedly secured to the roof rail 18 at the location 24 which is forwardly disposed (i.e., relative to a longitudinal direction of the vehicle 12 and of the roof rail 18) relative to the location 22 at which the second gusset member 16 is fixedly secured to the roof rail 18.

More specifically, the first gusset member 14 includes a first gusset roof rail portion 14b extending vertically along the inward side 18a of the roof rail. Likewise, the second gusset member 16 includes a second gusset roof rail portion 16b extending vertically along the inward side 18a of the roof rail 18. As shown, the first and second gusset roof rail portions 14b, 16b are spaced apart from one another along a longitudinal length of the roof rail 18 with the first gusset roof rail portion 14b fixedly secured to the roof rail 18 at the first gusset location 24 and the second gusset roof rail portion fixedly secured to the roof rail 18 at the second gusset location 22.

Figure 3:
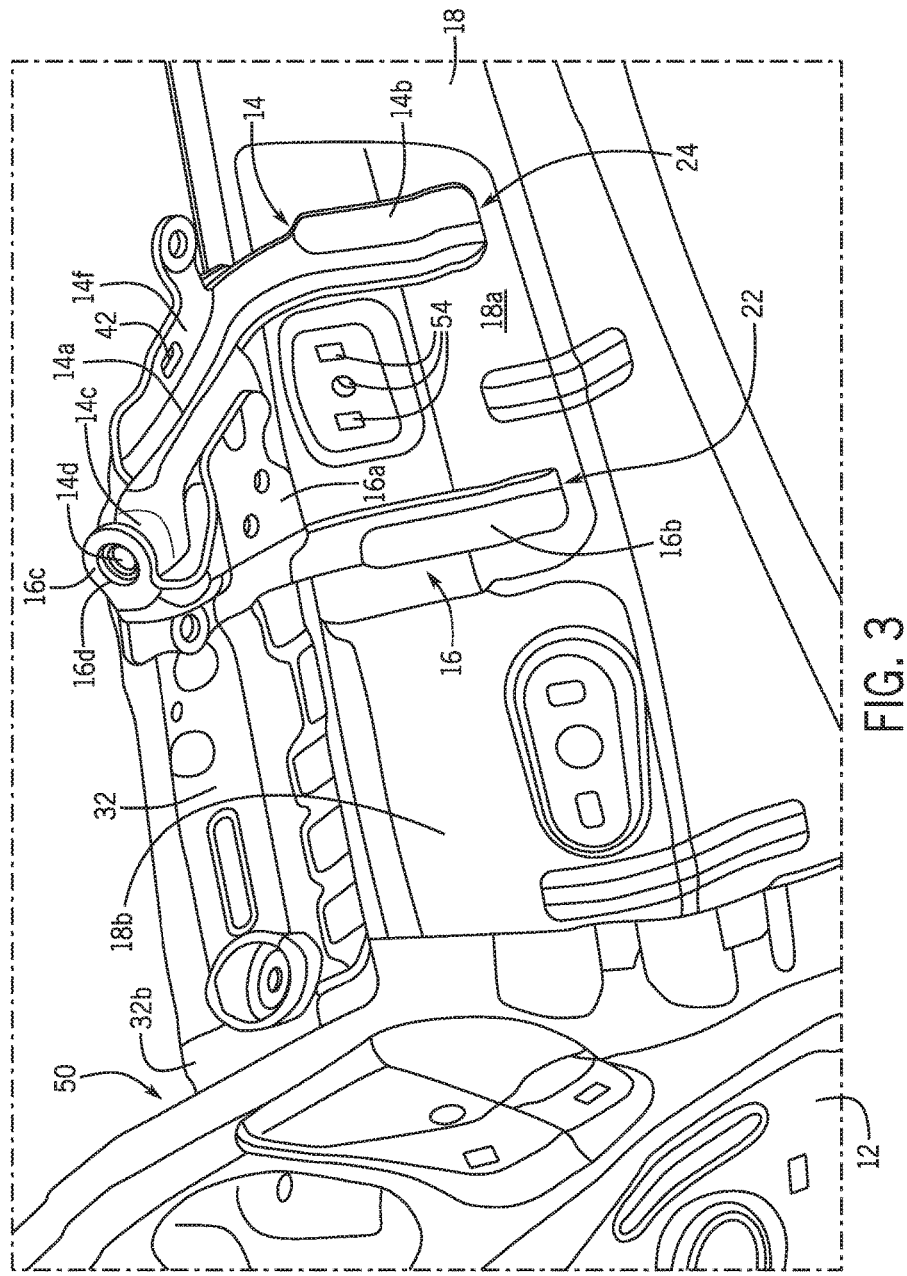
FIG. 3 is a partial perspective view similar to FIG. 1 but shown enlarged and with the power tailgate motor removed to show a first gusset, a second gusset and an upper reinforcement member of the power tailgate mounting system.

The first gusset tailgate motor mounting portion 14a includes a first gusset distal mounting portion 14c spaced apart laterally from the roof rail 18 and defining a first gusset aperture 14d for mounting the tailgate motor 20. Likewise, the second gusset tailgate motor mounting portion 16a includes a second gusset distal mounting portion 16c spaced apart laterally from the roof rail 18 and defining a second gusset aperture 16d for mounting the tailgate motor 20. The first and second gusset apertures 14d, 16d are in registry with one another for providing a mounting aperture 14d, 16d for the tailgate motor 20. As best shown in FIG. 3, the second gusset distal mounting portion 16c overlaps the first gusset distal mounting portion 14c. As shown, a plane of each of the first and second gusset apertures 14d, 16d is arranged generally parallel to the inward side 18a of the roof rail 18 and spaced apart from the inward side 18a of the roof rail 18. The second gusset tailgate motor mounting portion includes a second gusset lower flange 16e that overlaps and is secured to a first gusset lower flange 14e of the first gusset tailgate motor mounting portion 14a. As shown, the second gusset lower flange 16e and the first gusset lower flange 14e are oriented generally orthogonally relative to the inward side 18a of the roof rail 18.

Figure 4:
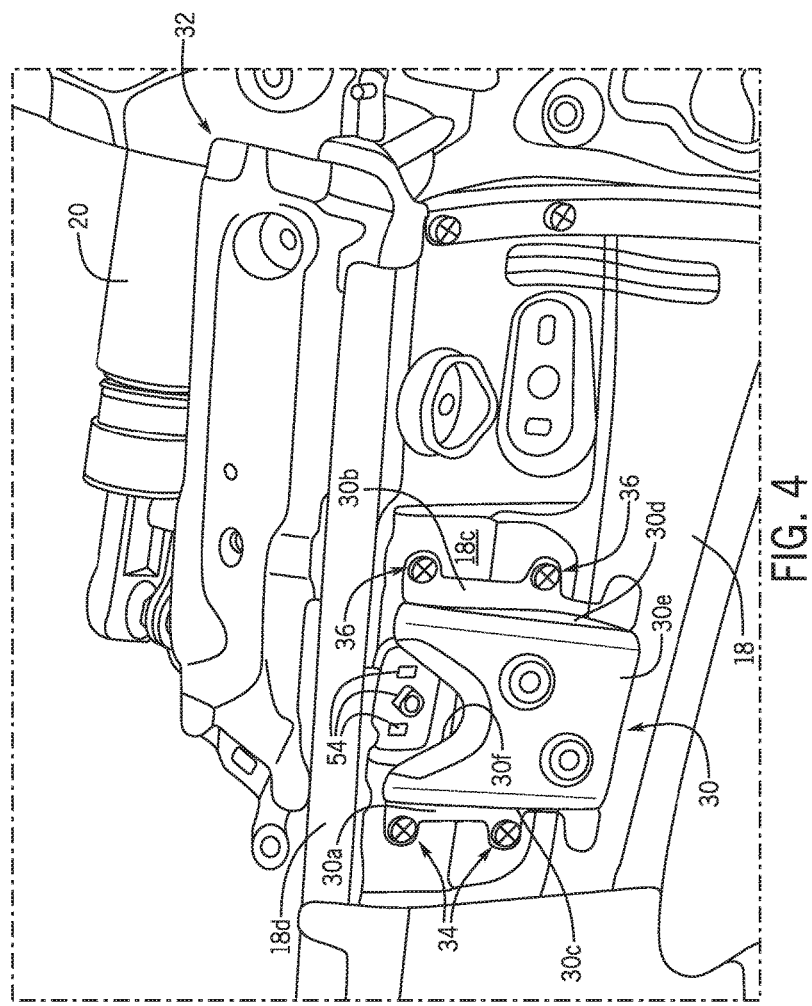
FIG. 4 is a partial perspective view of the power tailgate mounting system of FIG. 1 but shown from an outside perspective of the vehicle to show an external reinforcement member of the power tailgate mounting system.

The mounting system 10 can further include an outward reinforcement member 30 and an upper reinforcement member 32. As best shown in FIG. 4, the outward reinforcement member 30, also referred to herein as an external reinforcement member, is secured to the roof rail 18 at a location or locations 34, 36 opposite that at which the first and second gusset members 14, 16 are fixedly secured to the roof rail 18 (i.e., at locations 22 and 24). More particularly, the outward reinforcement member 30 is secured to an outward side 18c of the roof rail 18 at locations 34, 36 directly opposite to where the first and second gusset members 14, 16 are secured (i.e., at locations 22 and 24) to the inward side 18a of the roof rail 18. Specifically, the outward reinforcement member 30 includes a first flange portion 30a overlapping the outward side 18c of the roof rail 18 at the location or locations 34 directly opposite to where the first gusset member 14 is secured to the inward side 18a of the roof rail 18. Likewise, the reinforcement member 30 includes a second flange portion 30b overlapping the outward side 18c of the roof rail 18 at the location or locations 36 directly opposite to where the second gusset member 16 is secured to the inward side 18a of the roof rail 18.

Additionally, the outward reinforcement member 30 includes a first wall 30c extending from the first flange portion 30a and generally oriented orthogonally relative to the outward side 18c of the roof rail 18 and the first flange portion 30a, and a second wall 30d extending from the second flange portion 30b and generally oriented orthogonally relative to the outward side 18c of the roof rail 18 and the second flange portion 30b. Further, the outward reinforcement member 30 includes a connecting wall 30e extending between the first wall 30c and the second wall 30d. The connecting wall 30e is generally parallel to the outward side 18c of the roof rail 18 and spaced apart from the outward side 18c of the roof rail 18.

The upper reinforcement member 32 overlaps and is secured to the first and second gusset tailgate motor mounting portions 14a, 16a of, respectively, the first and second gusset members 14, 16 along upper flanges 14f, 16f thereof. More particularly, the upper reinforcement member 32 can be secured to each of the first and second gusset tailgate motor mounting portions 14a, 16a, and particularly to the respective upper flanges 14f, 16f of the first and second gusset tailgate motor mounting portions 14a, 16a that are spaced apart from one another along a longitudinal length of the roof rail 18. More specifically, the first gusset tailgate motor mounting portion 14a includes the first gusset upper flange 14f to which the reinforcement member 32 overlaps and is secured (i.e., forming a first location at which the upper reinforcement member 32 is secured to the first and second gusset members 14, 16). Likewise, the second gusset tailgate motor mounting portion 16a includes the second gusset upper flange 16f to which the reinforcement member 32 overlaps and is secured (i.e., forming a second location at which the upper reinforcement member 32 is secured to the first and second gusset members 14, 16).

Figure 2:
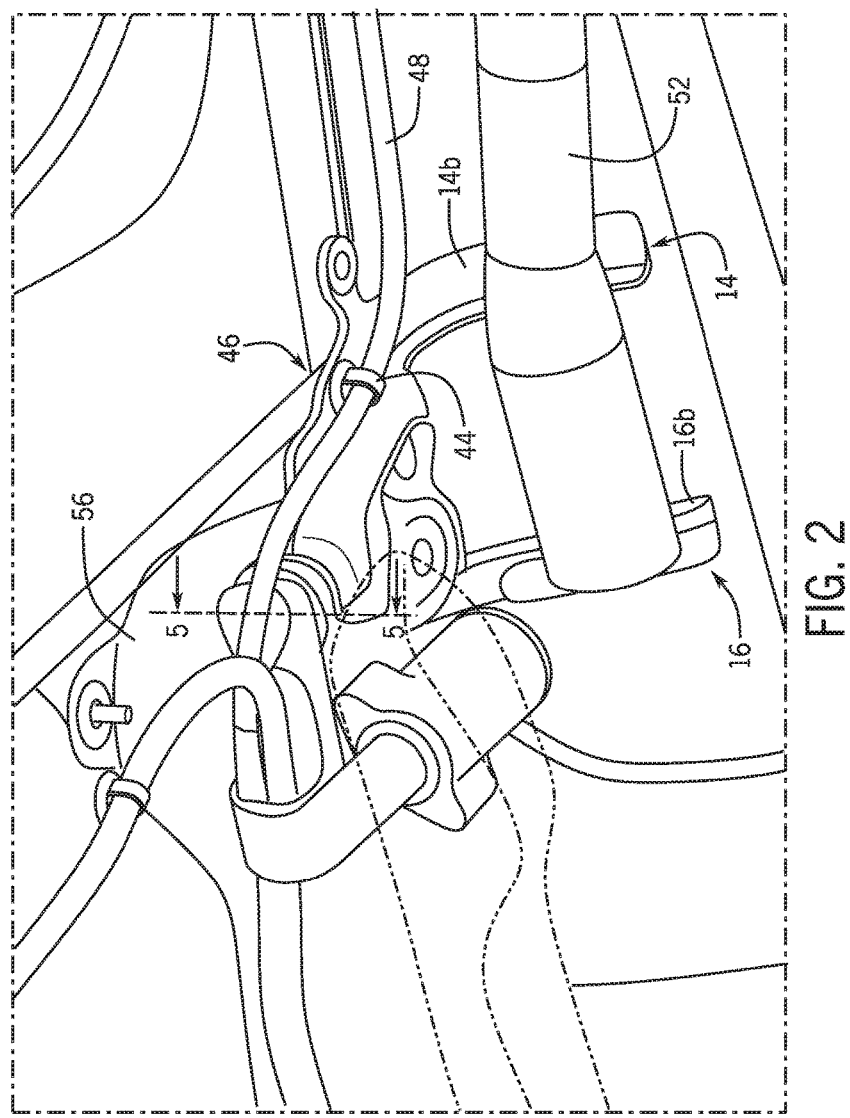
FIG. 2 is a view similar to FIG. 1 but shown with a motor cover disposed over the power tailgate motor and shown with a side airbag secured nearby.

The first gusset upper flange 14f defines a clip aperture 42 for mounting an associated wire harness clip 44 at a location 46 spaced inwardly relative to the roof rail 18 and forwardly relative to the terminal rearward end 18b of the roof rail 18. The wire harness clip carries a wire harness 48 as best shown in FIG. 2. As illustrated, the first gusset lower flange 14e is spaced apart vertically below the first gusset lower flange 14e. Likewise, the second gusset lower flange 16e is spaced apart vertically below the second gusset upper flange 16f. As already discussed, the second gusset lower flange 16e overlaps and is secured to the first gusset lower flange 14e to provide a reinforced structure to which the vehicle tailgate motor 20 is mounted.

The roof rail 18 includes a roof rail upper flange 18d extending angularly relative to the inward side 18a (and the outward side 18c) of the roof rail 18. The roof rail upper flange 18d overlaps and is secured to an inward edge portion 32a of the reinforcement member 32. The reinforcement member 32 extends inwardly in a generally orthogonal orientation relative to the inward side 18a of the roof rail 18. The reinforcement member 32 also extends rearwardly from the first gusset member 14 and has a rearward portion 32b secured to a corner structure 50 (FIG. 3) at which the roof rail 18 terminates. As shown, the first and second gusset members 14, 16 are spaced apart forwardly along the roof rail 18 relative to the corner structure 50.

The mounting system 10 can additionally include features for accommodating an associated side airbag 52 (shown in FIG. 2). In particular, as shown best in FIGS. 1 and 3, the roof rail 18 can include or define one or more (i.e., at least one) airbag mounting aperture 54 defined therein for mounting the side airbag 52 to the roof rail 18. The one or more airbag apertures 54 are disposed between and spaced apart from both the first gusset roof rail portion 14b and the second gusset roof rail portion 16b. Accordingly, the first and second gusset members 14, 16, and particularly the first and second gusset roof rail portions 14b, 16b, provide the necessary rigidity for the mounting of the tailgate motor 20 while also enabling mounting access to the airbag apertures 54 defined in the roof rail 18. Also, the connecting wall 30e of the outward reinforcement member 30 can include an aperture or recess 30f to expose the airbag apertures 54 defined in the roof rail 18 on the outward side 18c of the roof rail 18 for mounting the side airbag 52 adjacent the inward side 18a of the roof rail 18. In particular, the mounting system 10 provides clearance for the side airbag 52, including a side airbag bracket (not shown) and appropriate clearance for a tool (not shown) that is used to install a fastener to install the side airbag 52 to the roof rail 18 via the side airbag bracket.

Figure 5:
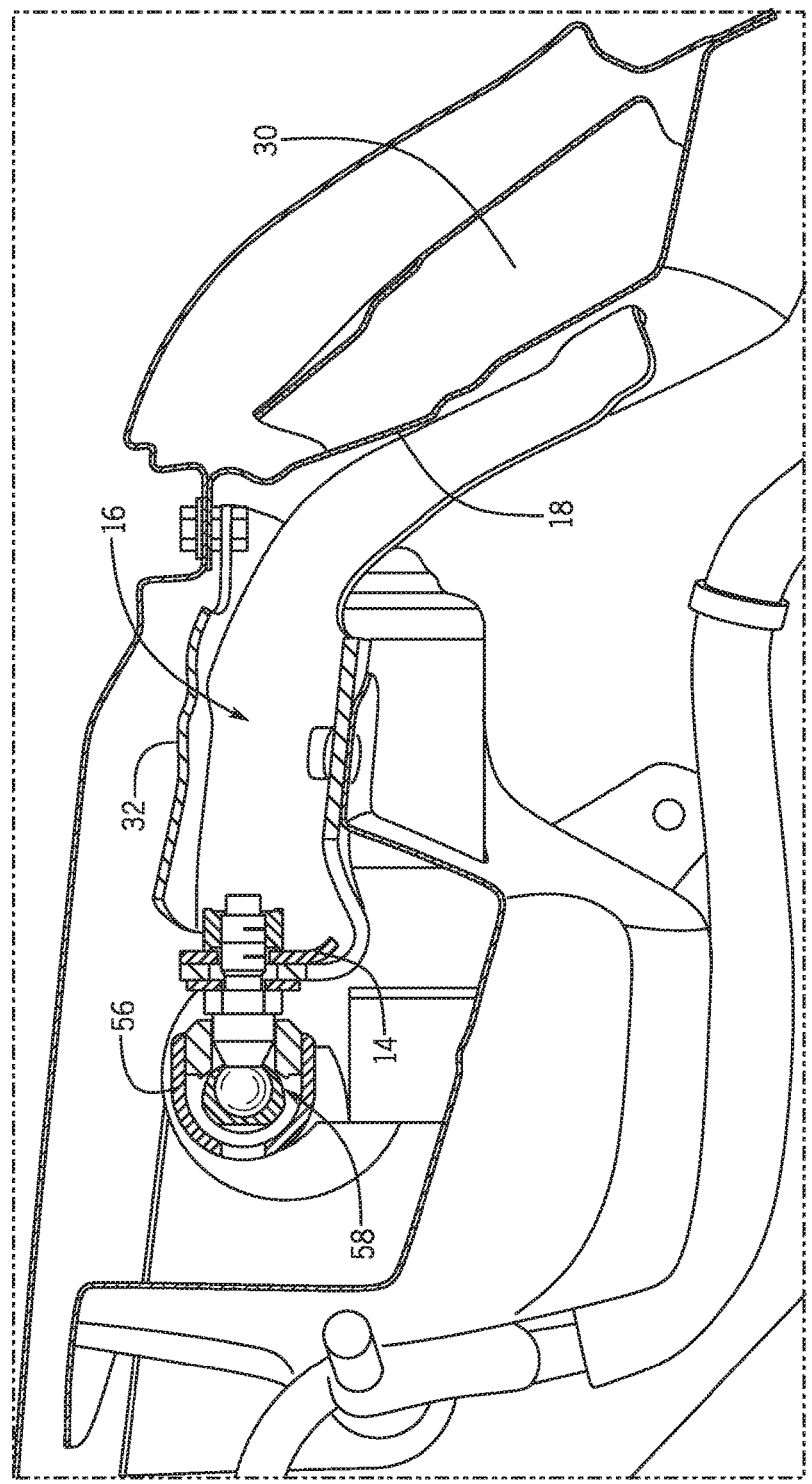
FIG. 5 is a schematic cross-sectional view taken along the line 5-5 of FIG. 2.
Figure 6:
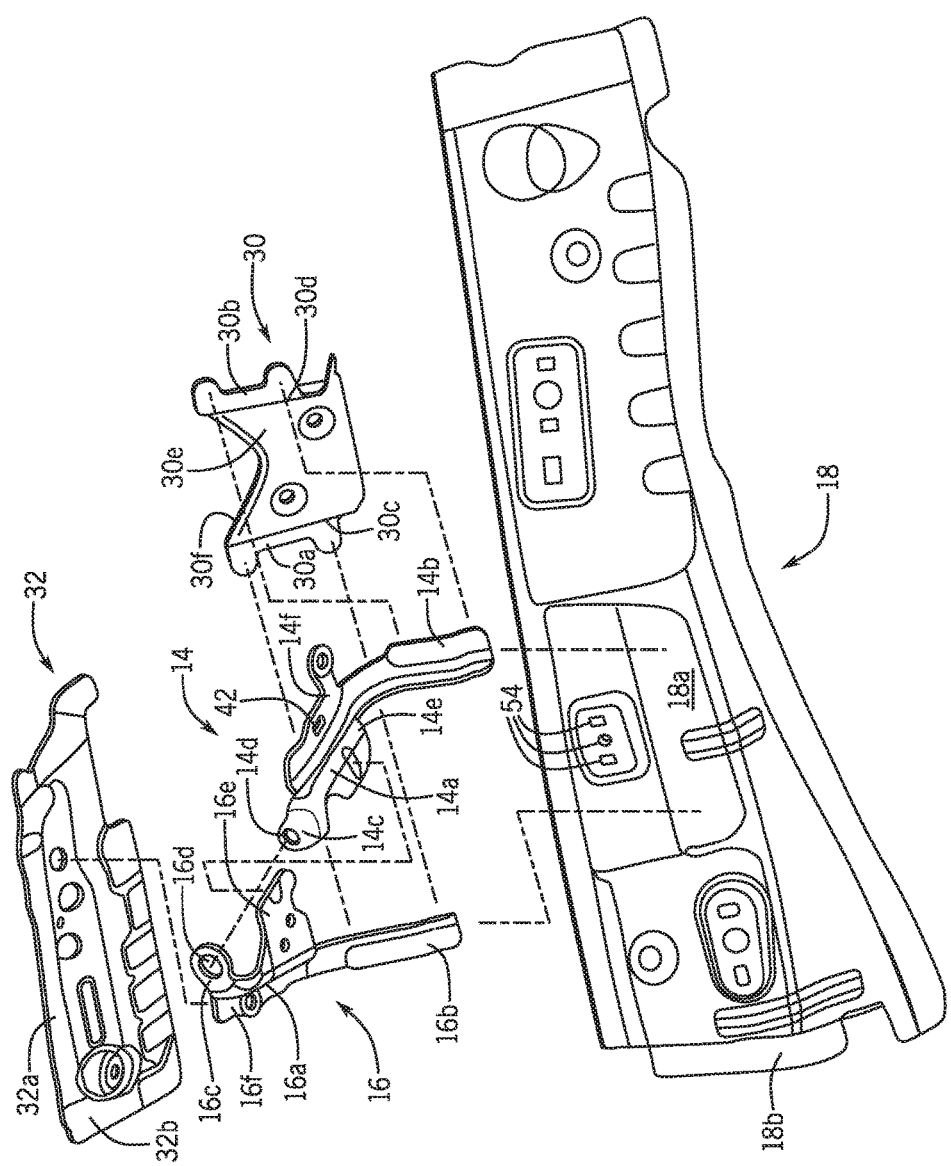
FIG. 6 is an exploded perspective view of the power tailgate mounting system.

The components of the mounting system 10, which in the illustrated embodiment include the first gusset member, the second gusset member 16, the outward reinforcement member 30, and the upper reinforcement member 32 can be fixedly secured to one another and/or to the roof rail 18 via welding, as is known and understood by those skilled in the art. Additionally, a motor cover 56 (shown in FIGS. 2 and 5) can be fixedly connected, such as via welding, over the tailgate motor 20 and the mounting system 10. As best shown in FIG. 5, the first and second gusset members 14, 16, and particularly the distal mounting portions 14c, 16c having the apertures 14d, 16d defined therein provide a rigid mount for a ball stud 58 of the tailgate motor 20. By the overlap between the first and second gusset members 14, 16, and also by the reinforcing provided by the reinforcement member 30, 32, the mounting system 10 provides a suitable rigid mount for the tailgate motor 20.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A power tailgate mounting system for a vehicle, comprising:
   a first gusset member secured to an inward side of a roof rail of the vehicle at a rear end portion of the roof rail, the first gusset member having a first gusset tailgate motor mounting portion extending laterally inwardly from the roof rail for mounting an associated tailgate motor; and
   a second gusset member secured to the inward side of the roof rail at the rear end portion of the roof rail, the second gusset member having a second gusset tailgate motor mounting portion extending laterally inwardly from the roof rail for mounting the associated tailgate motor, the second gusset tailgate motor mounting portion overlapping the first gusset tailgate motor mounting portion.

2. The power tailgate mounting system of claim 1 wherein the first gusset member includes a first gusset roof rail portion extending vertically along the inward side of the roof rail, and wherein the second gusset member includes a second gusset roof rail portion extending vertically along the inward side of the roof rail, the first and second gusset roof rail portion spaced apart from one another along a longitudinal length of the roof rail.

3. The power tailgate mounting system of claim 2 wherein the first gusset tailgate motor mounting portion includes a first gusset distal mounting portion spaced apart laterally from the roof rail and defining a first gusset aperture for mounting the associated tailgate motor, and wherein the second gusset tailgate motor mounting portion includes a second gusset distal mounting portion spaced apart laterally from the roof rail and defining a second gusset aperture for mounting the associated tailgate motor, the second gusset distal mounting portion overlapping the first gusset distal mounting portion.

4. The power tailgate mounting system of claim 3 wherein a plane of each of the first and second gusset apertures is arranged generally parallel to the inward side of the roof rail and spaced apart from the inward side of the roof rail.

5. The power tailgate mounting system of claim 3 wherein the second gusset tailgate motor mounting portion includes a second gusset lower flange that overlaps and is secured to a first gusset lower flange of the first gusset tailgate mounting portion, the second gusset lower flange and the first gusset lower flange oriented generally orthogonally relative to the inward side of the roof rail.

6. The power tailgate mounting system of claim 2 wherein the roof rail defines at least one airbag mounting aperture for mounting an associated side airbag and said at least one airbag mounting aperture is disposed between and spaced apart from both the first gusset roof rail portion and the second gusset roof rail portion.

7. The power tailgate mounting system of claim 1 further including:
   an external reinforcement member secured to an outward side of the roof rail at locations directly opposite to where the first and second gusset members are secured to the inward side of the roof rail.

8. The power tailgate mounting system of claim 7 wherein the external reinforcement member includes:
   a first flange portion overlapping the outward side of the roof rail at the location directly opposite to where the first gusset member is secured to the inward side of the roof rail; and
   a second flange portion overlapping the outward side of the roof rail at the location directly opposite to where the second gusset member is secured to the inward side of the roof rail.

9. The power tailgate mounting system of claim 8 wherein the external reinforcement member further includes:
   a first wall extending from the first flange portion and generally oriented orthogonally relative to the outward side of the roof rail and the first flange portion;
   a second wall extending from the second flange portion and generally oriented orthogonally relative to the outward side of the roof rail and the second flange portion; and
   a connecting wall extending between the first wall and the second wall, the connecting wall generally parallel to the outward side of the roof rail and spaced apart from the outward side of the roof rail.

10. The power tailgate mounting system of claim 9 wherein the connecting wall includes an aperture to expose at least one airbag mounting aperture defined in the roof rail for mounting an associated side airbag adjacent the inward side of the roof rail.

11. The power tailgate mounting system of claim 1 further including:
   an upper reinforcement member secured to each of the first and second gusset tailgate motor mounting portions at locations on the first and second gusset tailgate motor mounting portions that are spaced apart from one another along a longitudinal length of the roof rail.

12. The power tailgate mounting system of claim 11 wherein:
   the first gusset tailgate motor mounting portion includes a first gusset upper flange to which the upper reinforcement member overlaps and is secured; and the second gusset tailgate motor mounting portion includes a second gusset upper flange to which the upper reinforcement member overlaps and is secured.

13. The power tailgate mounting system of claim 12 wherein the first gusset upper flange defines a clip aperture for mounting an associated wire harness clip at a location spaced inwardly relative to the roof rail and forwardly relative to a terminal rearward end of the roof rail.

14. The power tailgate mounting system of claim 12 wherein:
the second gusset tailgate motor mounting portion includes a second gusset lower flange spaced apart vertically below the second gusset upper flange;
the first gusset tailgate motor mounting portion includes a first gusset lower flange spaced apart vertically below the first gusset lower flange; and
the second gusset lower flange overlaps and is secured to the first gusset lower flange.

15. The power tailgate mounting system of claim 12 wherein the roof rail includes a roof rail upper flange extending angularly relative to the inward side of the roof rail, the roof rail upper flange overlapping and being secured to an inward edge portion of the reinforcement member, the reinforcement member extending inwardly in a generally orthogonal orientation relative to the inward side of the roof rail.

16. The power tailgate mounting system of claim 12 wherein the reinforcement member extends rearwardly from the first gusset member and has a rearward portion secured to a corner structure at which the roof rail terminates, the first and second gusset members spaced apart forwardly along the roof rail relative to the corner structure.

17. The power tailgate mounting system of claim 1:
wherein the roof rail is a side roof rail;
wherein the first gusset member is fixedly secured to the side roof rail adjacent and spaced forwardly relative to a terminal end of the side roof rail; and
and wherein the second gusset member is fixedly secured to the side roof rail adjacent and spaced forwardly relative to the terminal end of the side roof rail, the second gusset member secured to side roof rail at a second gusset location spaced apart rearwardly relative to a first gusset location at which the first gusset member is secured to the side roof rail.

18. The cantilevered motor mounting system of claim 17 further including:
an outward reinforcement member secured to the side roof rail at a location opposite that at which the first and second gusset members are fixedly secured to the side roof rail; and
an upper reinforcement member overlapping and being secured to the first and second gusset tailgate motor mounting portions along upper flanges thereof.

19. The cantilevered motor mounting system of claim 17 wherein the second gusset tailgate mounting portion overlaps the first gusset tailgate mounting portion to provide a reinforced structure to which the vehicle tailgate motor is mounted.

* * * * *